United States Patent Office

2,871,101
Patented Jan. 27, 1959

2,871,101

MANUFACTURE OF HYDROGEN PEROXIDE

Frederick F. Rust, Oakland, and Lee M. Porter, Richmond Annex, Calif., assignors to Shell Development Company, San Francisco, Calif., a corporation of Delaware No Drawing. Application August 21, 1950
Serial No. 180,694

23 Claims. (Cl. 23—207)

This invention relates to the manufacture of hydrogen peroxide and it more particularly relates to the manufacture of hydrogen peroxide by the oxidation with molecular oxygen of secondary alcohols in the liquid state.

In the copending application Serial No. 130,852, filed December 2, 1949, now abandoned, there is disclosed and claimed a process for the production of hydrogen peroxide in which a secondary alcohol, such as isopropyl alcohol, is oxidized in the liquid state at elevated temperatures preferably between about 90° C. and about 140° C. The process can be carried out by passing gaseous oxygen preferably under superatmospheric pressure into and through the liquid alcohol in a suitable reaction vessel while carefully avoiding the presence in the reaction mixture of contaminants, such as ions of various of the heavy metals, that promote decomposition of hydrogen peroxide. As the oxidation of the alcohol is continued, hydrogen peroxide is formed and accumulates in the liquid mixture until the concentration may be as high as 15% to 20% $H_2O_2$ or even more. In batch operations, when the concentration of hydrogen peroxide has built up to a suitable level, the flow of gaseous oxygen is turned off and the hydrogen peroxide is recovered, for example, by diluting the mixture with water and fractionally distilling. Under suitable conditions yields of hydrogen peroxide as high as 94% of theory have been obtained.

It has been found that the occurrence of the desired reaction leading to the formation of hydrogen peroxide (rather than of water as the inorganic oxidation product) depends not only upon operating under suitable conditions of temperature and pressure and upon scrupulously maintaining freedom from materials that promote the decomposition of hydrogen peroxide, but also, at least in smaller scale operations, in some manner upon the specific nature of the inner surface of the reaction vessel. As an illustration of this effect of the inner surface, other conditions being equal the most rapid formation of and the highest yields of hydrogen peroxide have heretofore been obtained according to said process when conducted in glass reaction vessels that previously have been used repeatedly in non-catalytic processes for the oxidation of various organic compounds, e. g., hydrocarbons or the secondary alcohol itself. The initial use of similar glass vessels that have not been subjected to such prior use, or to other conditioning treatment, leads to substantially lower yields of and production rates of hydrogen peroxide, indicating that some change in the nature of the inner surface of the reactor occurs during such use or conditioning.

The mechanism of the role played by the surfaces of the reaction vessel in the formation of hydrogen peroxide in liquid phase from secondary alcohols is not well understood; accordingly, we do not wish or intend the invention to be limited according to any theory or theories that may be advanced herein. It appears to be probable, however, that the desired reaction depends, at least in part, upon both an initiation process that occurs at the liquid-solid interfaces at the solid surfaces in contact with the reaction mixture and also upon substantial absence of initiation, propagation, or catalysis of other, undesired reactions by or at the interfacial surfaces. The importance of the role played by the surfaces of the reactor also appears to depend upon the area of solid surface that is exposed to contact with a given volume of the liquid alcohol undergoing oxidation. Thus, in small reaction vessels (e. g., containing only a few gallons or less), in which the ratio of the number of units of surface area to the number of units of volume is relatively large, the nature of the surface appears to play a more important role than in larger vessels, characterized by a smaller ratio between the number of units of surface area and the number of units of volume. However, since in all reaction vessels there must be some solid surface in contact with the liquid reaction mixture, the effect of the nature of the surface cannot be entirely eliminated simply by increasing the size of the reactor.

The present invention provides a simple, practical, and effective method for bringing the surfaces of reaction vessels to be used in the process of the hereinbefore acknowledged copending application to a condition such that the vessels are adapted to direct use in the process without further conditioning treatment. The present invention also provides an improved method for the production of hydrogen peroxide by oxidation of secondary alcohols in the liquid state, characterized by a generally higher rate of production of hydrogen peroxide and by high yields of hydrogen peroxide. The present invention also provides means whereby a greater variety of reaction vessels, with minimum regard to their previous treatment or use, can be so treated, or conditioned, that they can be employed directly in the process for the liquid phase oxidation of secondary alcohols to produce hydrogen peroxide. Other advantages that are provided by the present invention will be seen from the disclosures hereinafter of the invention and its detailed application.

It now has been discovered in accordance with the present invention that the oxidation of secondary alcohols in liquid phase with molecular oxygen to produce hydrogen peroxide proceeds more efficiently and in a generally improved manner when the oxidation is conducted in a vessel the inner surfaces of which have been treated by contacting with a stabilizer for hydrogen peroxide. According to one embodiment of the invention, the reactor just prior to use in the oxidation is rinsed with a solution, e. g., a 5% aqueous solution, of a stabilizer for hydrogen peroxide. Excess solution is allowed to drain off, and if desired, the reactor may be rinsed, for example with the secondary alcohol to be employed. The rinsings are discarded and a fresh lot of the secondary alcohol is charged to the reactor and the flow of gaseous oxygen is started. High yields of hydrogen peroxide (exceeding 90%) and high production rates can be obtained in this manner using vessels which, if employed without the prior treatment with a hydrogen peroxide stabilizer, would lead to only low yields, if any, of hydrogen peroxide or to low rates of hydrogen peroxide formation. According to another embodiment, a small amount of hydrogen peroxide stabilizer can be added to the secondary alcohol fed to the oxidation process. When proceeding in this manner, the oxidation process and the treatment of the reactor surfaces are conducted concurrently. Similarly high yields and rates of production of hydrogen peroxide can be obtained by operating according to this embodiment. An embodiment of the invention that utilizes both of these procedures is preferred when the oxidation process is to be carried out continuously; namely, the reactor, before it is placed onstream, is first treated with a hydrogen peroxide stabilizer, as by rinsing with a solution thereof, and then after the oxidation has commenced and while the alcohol is fed to the reactor additional small amounts of hydrogen peroxide stabilizer are added either continuously or intermittently to the reactor, for example, by addition to the alcohol feed. The first treatment of the reactor serves to bring the surfaces of the reactor to a condition at which efficient production of hydrogen peroxide is attainable; the subsequent addition of hydrogen peroxide stabilizer to the reactor during the oxidation process serves to maintain the exposed surfaces within the reactor at optimum condition.

It has been suggested in the prior art that hydrogen peroxide stabilizers function by binding or adsorbing minute amounts of contaminating heavy metal ions that catalyze the decomposition of the hydrogen peroxide, and not by a direct stabilizing influence on the hydrogen peroxide molecule per se. The beneficial results of the treatment of the reactor surfaces with hydrogen peroxide stabilizers according to the present invention are realized even when the utmost care has been exerted in cleaning the reactors and purifying the reactants to exclude such contaminants. It is believed that the stabilizer is adsorbed on the exposed surface in the reactor and in this way so modifies the characteristics of the active sites on the surfaces that they more effectively enter into the initiation, propagation, or promotion of the reaction between the secondary alcohol and the oxygen. For each specific reactor there is a critical optimum amount of stabilizer that leads to the most effective conditioning of the exposed surfaces. In each case the particular amount that is optimum is determined by factors other than or in addition to the amount of any traces of heavy metal ions that may be present.

The amount of the hydrogen peroxide stabilizer necessary to produce a noticeable effect upon the oxidation of the secondary alcohol is extremely small. For example, the amount of sodium pyrophosphate that remains adsorbed on the inner surface of a one-half liter Pyrex flask when the flask is rinsed with 25 cc. of a 5% aqueous solution of sodium pyrophosphate and the solution adhering to the surface is then washed off with three successive 500 cc. portions of isopropyl alcohol, has a pronounced effect in increasing the yield and the rate of production of hydrogen peroxide when isopropyl alcohol is thereafter oxidized in the flask. When, as in continuous operations, the hydrogen peroxide stabilizer is added to the reaction mixture, as by incorporation in the liquid feed to the reactor, concentrations up to about 500 parts per million in the reaction mixture generally are employed, and the concentration frequently will be maintained below about 300 parts per million. Although the optimum concentration in any specific case will depend upon the particular reactor that is used, the specific secondary alcohol undergoing oxidation, and the specific hydrogen peroxide stabilizer that is used, in some cases the optimum concentration of the stabilizer may be as low as 10 parts per million. When orthophosphoric acid is used as the hydrogen peroxide stabilizer in the oxidation of isopropyl alcohol in an aluminum vessel, good results are obtained at concentrations from about 25 to about 300 parts per million.

Whether the optimum amount, or more or less than the optimum amount of the hydrogen peroxide stabilizer is present in any specific case can be determined readily by those skilled in the art on the basis of preliminary tests or from the effect of increase or decrease in the amount of stabilizer upon the reaction. When the amount present is substantially less than the optimum amount, the yield of hydrogen peroxide is low, say, below about 50% based on the oxygen consumed. In the presence of too much stabilizer the oxidation reaction tends to start slowly and, unless further steps referred to hereinafter are taken, only after a prolonged induction period. In this case also, the yield of hydrogen peroxide based upon the amount of oxygen consumed, is low. In the presence of optimum amounts of the hydrogen peroxide stabilizer the reaction starts readily, proceeds smoothly, and forms hydrogen peroxide at yields often as high as 90% to 95% of theory.

When too little hydrogen peroxide stabilizer is present the treatment of the reactor surfaces, as by rinsing with a solution of the stabilizer, can be repeated, using a more concentrated solution of the stabilizer if desired, or additional amounts of the stabilizer can be added directly to the reaction mixture by incorporation in the feed or otherwise, as hereinbefore indicated. In this manner, reactor surfaces that have been given a treatment that is found to be less intensive than the optimum treatment can be brought to a condition at which, in the absence of further steps, optimum rates of production of and yields of hydrogen peroxide can be obtained. When, on the other hand, too much of the stabilizer is present—that is, when the induction period is inconveniently prolonged and the rate of oxygen uptake, once the oxidation commences, is low—the excess stabilizer can be removed in most cases simply by washing the surfaces of the reactor, for example, with water or with the alcohol that is employed in the oxidation process. When more than the optimum amount of hydrogen peroxide stabilizer is present, the desired oxidation reaction preferably is initiated by addition of a free radical reaction initiator to the reaction mixture. With the assistance of an added free radical reaction initiator, the treated surfaces of reactors that otherwise would be refractory may be made capable of smoothly and rapidly promoting the desired reaction that leads to high yields of hydrogen peroxide.

The hydrogen peroxide stabilizers that are employed in accordance with the invention all are compounds that sequester, that is segregate, abstract, withdraw or envelope (from or in highly dilute aqueous solutions thereof, e. g., aqueous solutions at a concentration of 2 parts per million, more or less) substances that tend to catalyze the decomposition of hydrogen peroxide to water and oxygen, particularly ions of heavy metals, such as the ferric, the cupric, and the chromic ion. Such materials, when used as stabilizers, are thought to function by forming chemical complexes with such ions, by adsorbing them on or in colloidal micelles, by precipitation, or by other mechanisms. For brevity this class of stabilizers can and will be referred to as the sequestrating hydrogen peroxide stabilizers. It includes organic compounds, represented by the cyanides, alpha-hydroxyquinoline, acetanilide, benzoic acid, alpha-benzoyloxy-beta-dimethylaminobutyric acid, glycerine phenyl ether, thiourea, sodium salicylate, thymol, gum arabic, albumin, uric acid, guaiacol, phosphatides, acetylglycol, monoacetyl glycol ether, sodium benzenesulfonate, hexamethylenetetramine, and many others, as well as numerous inorganic compounds, such as salts of the oxy-acids of phosphorus, and the corresponding acids, tin compounds, aluminum compounds, silicates, magnesium salts, and the like. For the purposes of the present invention the organic stabilizers are in general less desirable than the inorganic stabilizers because under the strongly oxidizing conditions involved in the oxidation process the organic compounds are prone to be destroyed and their beneficial effect correspondingly reduced or destroyed.

The preferred inorganic stabilizers fall into two general groups. The first group comprises soluble salts, e. g., the alkali metal salts of the oxy-acids of tin, antimony, silicon and aluminum and the hydrous oxides of these elements, e. g., sodium stannate, sodium aluminate, sodium silicate, sodium metastannate, alpha-metastannic acid, hydrous antimony oxide, freshly precipitated alumina, freshly precipitated silica, silicic acid hydrosol, and hydrous stannic oxide. The second preferred group comprises the oxy-acids of phosphorus and salts thereof, particularly the alkali metal salts, and includes, for example, trisodium orthophosphate, disodium monohydrogen orthophosphate, monosodium dihydrogen orthophosphate, orthophosphoric acid, sodium pyrophosphate, dibasic sodium pyrophosphate, potassium dihydrogen orthophosphate, sodium hypophosphite, sodium metaphosphates, pyrophosphoric acid, and metaphosphoric acid.

The selection of the particular hydrogen peroxide stabilizer that is to be used for best results depends in part upon the material that forms the inner surface of the reaction vessel and in part upon the specific requirements of the operator of the process. It has been found that when the reactor is constructed of or lined with aluminum or other metal that is attacked by strong alkalies, treatment of the reactor with an alkaline-reacting stabilizer, such as sodium metastannate or trisodium orthophosphate, usually results in a prolonged induction period when the oxidation of the secondary alcohol is subsequently undertaken and that in such treated vessels the reaction is less amenable to initiation by added free radical reaction initiators. On the other hand, the alkaline reacting hydrogen peroxide stabilizers, when used for treating the inner surfaces of glass vessels, have led to the highest yields of hydrogen peroxide yet attained. The acid-reacting stabilizers of these preferred groups, such as orthophosphoric acid and sodium dihydrogen orthophosphate, are particularly suited to and are preferred for the treatment of the preferred aluminum reactors. The amount of the acid-reacting stabilizer remaining on the surface of the reactor or in the reaction mixture can be varied over a wider range without causing a prolonged induction period than when using an alkaline-reacting stabilizer. The acid-reacting stabilizers of these preferred groups have the further advantage that the surfaces of aluminum vessels that have been treated therewith are conducive to rapid reaction between the secondary alcohol and the oxygen, producing good yields of hydrogen peroxide in advantageously short process times. By the term acid-reacting stabilizers we refer to those materials that impart an acid reaction to water when dissolved therein. By the term alkaline-reacting stabilizers we refer to those materials that impart an alkaline reaction to water when dissolved therein.

Free radical reaction initiators that can be employed in accordance with the invention comprise materials that form free radicals in the reaction mixture, as by thermo-decomposition or dissociation, and include peroxides, the positive halogen compounds, diazo compounds, and others. The preferred free radical reaction initiators are the organic peroxides, which are organic compounds containing a peroxy radical (—O—O—) at least one valency of which is satisfied by an organic radical. Any organic peroxide can be employed, although the preferred organic peroxides are those in which at least one valency of the peroxy radical is satisfied by union with a hydrocarbon radical devoid of aliphatic carbon-to-carbon unsaturation and containing at least one tertiary carbon atom by a bond directly to a tertiary carbon atom. In each specific case the organic peroxide should be chosen with regard to the operating temperature that is to be used and the decomposition temperature of the organic peroxide, so that the organic peroxide will be one that decomposes to produce free radicals at the operating temperature. Illustrative organic peroxides are tertiary-butyl hydroperoxide, diethyl percarbonate, allyl percarbonate, benzoyl peroxide, acetyl peroxide, beta-chlorobenzoyl peroxide, methyl n-amyl ketone peroxide, diethyl peroxide, cumene hydroperoxide, di-tertiary-butyl peroxide, tertiary-butyl perbenzoate, 2,2-bis(tertiary-butylperoxy)butane, di-tertiary-butyl diperoxalate, di-tertiary-butyl permalonate, and 1,1-bis(tertiary-butylperoxy)cyclohexane. The amount of the free radical reaction initiator to be added generally is not over about 10% by weight of the secondary alcohol and as little as about 0.1% to about 3% by weight can generally be used effectively.

The free radical reaction initiator, if one is employed, can be added to the secondary alcohol that is to be oxidized either before or after or at the same time the alcohol and the gaseous oxygen are brought into contact. When the reaction vessel has been previously treated with the hydrogen peroxide stabilizer the addition of the free radical reaction initiator to the alcohol will, of course, follow such treatment. When the reactor surfaces are treated with the hydrogen peroxide stabilizer concurrently with the oxidation of the alcohol, with or without a preliminary treatment or rinsing of the reactor prior to the start of the oxidation, the addition of the free radical reaction initiator may precede, accompany, or follow the addition of the hydrogen peroxide stabilizer to the reaction mixture.

The improved method of the present invention is applicable when the oxidation of the secondary alcohol is conducted in vessels constructed of, or at least lined with, various materials, such as glass, tin, aluminum, aluminum alloys, an enamel, porcelain, magnesium, or a resin. The preferred metals of construction because of their adaptability to fabrication and the suitability of the surfaces are tin, aluminum, and suitable alloys of aluminum containing preferably not less than about 90% aluminum and only trace quantities (e. g., less than 1%) of heavy metal alloying elements. Typical suitable aluminum wrought alloys are those designated as Nos. 51S, 52S, 53S, 56S, and typical suitable aluminum casting alloys are those known as Nos. 13, 43, 214, A214, 218, 220, 356 and 360.

The improvement of the present invention is applicable to the oxidation of any secondary alcohol in liquid phase to produce hydrogen peroxide according to the method described more fully in the hereinbefore acknowledged copending application. The preferred alcohols are the lower aliphatic saturated monohydric alcohols, such as isopropyl alcohol, secondary butyl alcohol, the secondary amyl alcohols and the like. Cyclic secondary alcohols, such as cyclohexyl alcohol and 3,3,5-trimethylcyclohexyl alcohol, as well as unsaturated alcohols such as ethyl allyl carbinol, 2-cyclohexane-1-ol, and 1-phenylethanol, can also be employed. The secondary alcohols may be substituted by oxidation-stable substituent groups, such as the carboxyl, esterified carboxyl, keto, alkoxy groups, or the like.

The oxidation generally is carried out at temperatures above about 70 C. and the most favorable results both in the nature of rate of reaction and chemical efficiency are obtained by operating at temperatures above about 90° C. Temperatures as high as about 160° C. can be used. The preferred temperature range is from about 90° C. to 140° C.

The oxygen-containing gas used in the oxidation can be pure oxygen, air, oxygen-enriched air, or like gases containing molecular oxygen. The commercial oxygen of 80% to 95% oxygen concentration can be effectively used and has the advantage that it is obtainable at a cost less than the cost of pure oxygen, while being rich enough in oxygen to provide good reaction rates and yields of hydrogen peroxide.

Although atmospheric as well as subatmospheric pressures can be used in appropriate cases, the oxidation of the secondary alcohol preferably is carried out under a superatmospheric partial pressure of oxygen. When the secondary alcohol has a boiling point below the selected reaction temperature, a superatmospheric pressure is employed in order to keep the alcohol in liquid state. Pressures as high as 1000 pounds per square inch (gauge) can be used, a preferred range being pressures up to about 250 pounds per square inch (gauge).

The treatment of the surfaces of the reaction vessel with the hydrogen peroxide stabilizer, when carried out apart from the oxidation of the secondary alcohol, is done most conveniently and most effectively by washing or rinsing the reactor with a dilute solution, as a 1% to 10% solution in water or an organic solvent, of the stabilizer. Other methods, however, can be used, such as rubbing the surface with a mass of the solid stabilizer, vaporizing the stabilizer thereonto in small amounts, or contacting the surface with the stabilizer in liquid form. While it is preferred to apply the stabilizer in the form of a dilute solution, it will be appreciated that it is not desired to limit the generic method of the invention to this particular preferred method of practice.

It has been found that the highest yields of hydrogen peroxide (based upon the amount of alcohol converted) are obtained when the amount of alcohol converted does not exceed about 20% of the amount fed. In batchwise operations the oxidation of the alcohol thus preferably is continued until not more than about 20% of the alcohol has been consumed and the oxidation then is terminated and the hydrogen peroxide recovered. In continuous operations, in which the alcohol ordinarily will be continually fed into a reaction zone already containing an amount of the alcohol undergoing oxidation and product continuously withdrawn from the reaction zone, the rate of introduction of the alcohol and withdrawal of product can be so adjusted that the desired proportionate conversion of the alcohol feed is obtained, the concentration of hydrogen peroxide in the alcohol undergoing oxidation remaining substantially constant at the desired level. In either case the hydrogen peroxide can be conveniently recovered by diluting the reaction product with about an equal volume of water and fractionally distilling to recover the hydrogen peroxide produced. As disclosed in the acknowledged copending application, other methods can be employed for the recovery of the hydrogen peroxide, reference hereby being made thereto for such disclosure.

The following examples will illustrate the invention and will show details of application of the method thereof. In the examples the gas volumes are at normal temperature and pressure (0° C., 760 mm. Hg) unless otherwise specified.

*Example I*

This example illustrates treatment of a glass reaction vessel with an acid-reacting inorganic stabilizer. The example consists of three runs. The reaction vessel was a spherical 500 cc. Pyrex flask (low-alkali content borosilicate glass) provided with thermometer well and gas inlet tube opening near the bottom of the flask. The flask was connected directly to an ice water-cooled reflux condenser vertically positioned for total return to the flask of materials condensed from the effluent from the flask. Oxygen was circulated at constant pressure in a closed system from a calibrated 10 liter reservoir through the flask containing the alcohol, thence via the reflux condenser to a solid carbon dioxide-acetone-cooled trap and thence via an all-glass circulating pump back to the reservoir. The flask was immersed in a heated oil bath.

*Run 1.*—In the first run a new flask was carefully rinsed out with a large amount of redistilled isopropyl alcohol and drained. To the flask there then were charged 300 cc. of redistilled isopropyl alcohol. The flask was connected to the system, air in the system was displaced by oxygen, and the system was pressured to 35 pounds per square inch (gauge) with gaseous oxygen. The temperature of the oil bath was increased from 104° C. to 107° C., and the circulation of gaseous oxygen was started. The oxygen was circulated at a rate sufficient to agitate the alcohol thoroughly and to keep it saturated with oxygen (about 150 cc. per minute measured at the operating temperature and pressure). As the oxygen was consumed further oxygen was added from the reservoir to keep the pressure constant. The oxygen flow was continued for 21 hours at 35 pounds pressure and a reaction temperature of 104° C. to 107° C. by which time about 14,500 cc. of oxygen had been consumed. The system then was rapidly cooled, the contents of the flask were withdrawn, combined with the contents of the coldtrap, and the amount of $H_2O_2$ that had been produced was determined. There was found 0.254 mole of hydrogen peroxide, which corresponds to a 39.1% yield of $H_2O_2$ based upon the amount of oxygen consumed.

*Run 2.*—For the second run the same flask was then rinsed out with isopropyl alcohol and the foregoing run duplicated, except that the run was terminated after 19 hours. About 15,100 cc. of oxygen were consumed. The yield of $H_2O_2$ was found to be 50.6% based on the oxygen consumed.

*Run 3.*—For the third run the same flask first was rinsed out with about 50 cc. of a 5% aqueous solution of sodium metastannate, inverted, and permitted to drain for one minute. Fresh isopropyl alcohol (300 cc.) then was added to the flask and the above runs duplicated except that a reaction time of 34.5 hours was used. About 15,700 cc. of oxygen were consumed. The yield of $H_2O_2$ was about 88.5% based on the amount of oxygen consumed.

From the foregoing experiments it will be seen that while re-use of the flask led to a moderate improvement in the yield of hydrogen peroxide, namely, from about 40% to about 50%, the treatment of the flask with sodium metastannate increased the yield to almost 90%. That the benefits of the invention can be obtained with reaction vessels not previously used is shown by the following example.

*Example II*

The procedure and apparatus was as described in Example I. The flask used for this experiment was a second new Pyrex flask identical in all respects to the flask used in the preceding example. It was first rinsed out with 50 cc. of a saturated aqueous solution of sodium metastannate, inverted and allowed to drain for one minute. The isopropyl alcohol (300 cc.) then was added and the oxidation carried out as described in Example I, the reaction being terminated after 19 hours. About 15,300 cc. of oxygen were consumed. The yield of $H_2O_2$ was found to be 87.8% based upon the amount of oxygen consumed.

*Example III*

This example illustrates the deadening effect of an excess of an alkaline-reacting stabilizer on glass surfaces and the activating effect of a free radical reaction initiator. The example consists of three runs using the flask that was employed in the experiment described in Example II.

*Run 1.*—Without further treatment the flask used in Example II was washed with isopropyl alcohol and a fresh charge of 300 cc. of isopropyl alcohol was added. The isopropyl alcohol then was oxidized under the same conditions used in Example II except that the reaction time was 13 hours. The amount of oxygen consumed was 16,850 cc. The yield of $H_2O_2$ was found to be 74%. This run indicates that the surfaces of the flask were conditioned by the remaining small amounts of adsorbed stabilizer.

*Run 2a.*—The flask used in run 1 was rinsed with a further amount of metastannate solution, drained for one minute, 300 cc. fresh isopropyl alcohol were charged to the flask and the flow of oxygen started. After 49.5 hours at 104° C. to 107° C. and 35 pounds' oxygen pressure no oxygen had been consumed, indicating that the additional amount of stabilizer lead to an unduly prolonged induction period.

*Run 2b.*—The flask from run 2a therefore was cooled, opened and 10 cc. of 2,2-bis(tertiary-butylperoxy)butane were added to the contents. The flask then was reconnected to the system and the oxidation continued. The reaction commenced as soon as the flow of oxygen was started and by the end of 13 hours 16,200 cc. of oxygen had been consumed. The amount of H₂O₂ produced was found to correspond to a 98.5% yield based upon the amount of oxygen consumed.

*Example IV*

Results similar to those described in Example III were obtained when sodium pyrophosphate was substituted for the sodium metastannate. This example also consists of three runs.

*Run 1.*—A new flask identical to those used in the preceding examples was taken. It was first rinsed with 50 cc. of a 5% aqueous solution of sodium pyrophosphate, then inverted and permitted to drain for one minute. Three hundred cubic centimeters of isopropyl alcohol were added and the oxidation carried out as described in Example I, the run being concluded after 35.3 hours. The amount of oxygen consumed was 15,900 cc. The yield of H₂O₂ was 88% based upon the oxygen consumed.

*Run 2.*—The flask from run 1 was rinsed again with a further portion of the sodium pyrophosphate solution, drained, charged with 300 cc. fresh isopropyl alcohol, and the oxidation carried out as above. After the run had been continued for 68 hours the amount of oyxgen consumed was 5,200 cc.

*Run 3.*—The same flask then was again washed with 5% sodium pyrophosphate solution and run 2 duplicated except that (a) 10 cc. of 2,2-bis(tertiary-butylperoxy)-butane was added before the flow of oxygen was started and (b) a reaction time of 18.2 hours was used. In this time, 16,500 cc. of oxygen were consumed. The yield of H₂O₂ was found to be 95.5% based upon the amount of oxygen consumed.

*Example V*

For this run there was used a 3 liter reactor constructed of 52S aluminum. Oxygen in a closed system was circulated from a 100 liter steel reservoir through the reactor containing the alcohol. As in the apparatus described in Example I, the oxygen leaving the reactor passed through a glass reflux condenser mounted vertically on the top of the reactor, thence through a trap cooled by solid carbon dioxide-acetone and via a galss pump back into the reservoir. All reactor inlet and outlet tubes, as well as the thermocouple well and sampling tube, were constructed of aluminum. Before being first put into use the reactor was filled with 0.5% aqueous NaOH solution and, after rinsing with water, pickled overnight with 35% sulfuric acid and thoroughly washed with water. It was then washed with a 5% aqueous solution of orthophosphoric acid and rinsed with isopropyl alcohol. With this reactor a reaction temperature of about 114° C. and an oxygen pressure of about 50 pounds per square inch (gauge) were used, with a charge of 2500 cc. of isopropyl alcohol and 20 cc. of 2,2-bis(tertiary-butylperoxy)butane. After a preliminary run in the treated reactor, a fresh charge of isopropyl alcohol and 2,2-bis(tertiary-butylperoxy)butane was added and oxidized. After six hours, 115,000 cc. of oxygen were consumed, 84% of which was accounted for as hydrogen peroxide.

*Example VI*

This example illustrates treatment of the reactor surface with soluble sodium stannate. The apparatus and procedure described in Example I were used. The experiment was started with a new flask identical to that described in Example I. The reaction temperature was 105° C. to 110° C., the oxygen pressure was 35 pounds per square inch (gauge), and for each run 300 cc. of isopropyl alcohol were charged to the reactor. Prior to the first run the reactor was washed with an aqueous solution of soluble sodium stannate, Na₂SnO₃·3H₂O, and allowed to drain for about minute. The charge consisted of the pure alcohol. Prior to each of the succeeding runs the flask was treated as shown in the following table, charged with the alcohol and 5 cc. of 2,2-bis(tertiary-butylperoxy)butane were added. The results shown in the following table were obtained.

| Run No. | Treatment of Flask | Oxidation Time, Hours | Oxygen Consumed, cc. at 0° C., 760 mm. Hg | H₂O₂ Yield (percent on oxygen consumed) |
|---|---|---|---|---|
| 1 | New reactor washed with sodium stannate solution. | 16.6 | 0 | 0 |
| 2 | Reactor again washed with sodium stannate solution. | 15.0 | 15,300 | 60.6 |
| 3 | Reactor from Run 2 washed with isopropyl alcohol. | 8.3 | 14,700 | 77.7 |
| 4 | Reactor from Run 3 washed with sodium stannate solution. | 10.6 | 15,300 | 94.2 |

The above results indicate a prolonged induction period when the reactor was washed with the sodium stannate solution and no initiator added. The initiator added in the succeeding three runs eliminated the induction period and resulted in the production of hydrogen peroxide in high yields which reached a maximum in run 4.

*Example VII*

This example illustrates treatment of the reactor surface with trisodium phosphate. The example consists of three runs carried out according to the procedure and under the conditions described in Example I. The flask used in run 1 was a new flask identical with that described in Example I. Before the first run the inside of the flask was washed with a 5% aqeuous solution of trisodium phosphate and the flask was permitted to drain for one minute. No initiator was added in run 1. In each of the succeeding runs 5 cc. of 2,2-bis(tertiary-butylperoxy)butane was included in the charge. The results shown in the following table were obtained.

| Run No. | Treatment of Flask | Oxidation Time, Hours | Oxygen Consumed, cc. at 0° C., 760 mm. Hg | H₂O₂ Yield (percent on oxygen consumed) |
|---|---|---|---|---|
| 1 | New flask washed with trisodium phosphate solution. | 16.0 | 0 | 0 |
| 2 | Flask from Run 1 rinsed with isopropyl alcohol. | 8.2 | 15,950 | 75.6 |
| 3 | Flask from Run 2 washed with trisodium phosphate solution. | 8.3 | 13,800 | 62.2 |

*Example VIII*

This example illustrates use of an acidic stabilizer, namely, monosodium dihydrogen orthophosphate. The example consists of four runs carried out with the apparatus described in Example I. The flask used in run 1 was a new flask identical to that used in the preceding example. The monosodium dihydrogen orthophosphate was employed in the form of a 5% aqueous solution. Prior to each run the flask was treated as shown in the following table. No initiator was employed in runs 1, 2 and 3. Prior to the start of run 4, 5 cc. of 2,2-bis-(tertiary-butylperoxy)butane were added to the reaction vessel.

| Run No. | Treatment of Flask | Oxidation Time, Hours | Oxygen Consumed, cc. at 0° C., 760 mm. Hg | H₂O₂ Yield (percent on oxygen consumed) |
|---|---|---|---|---|
| 1 | New flask washed with stabilizer solution and drained for one minute. | 40 | 15,300 | 83.6 |
| 2 | Flask from Run 1 washed with isopropyl alcohol. | 26.1 | 15,300 | 87.7 |
| 3 | Flask from Run 2 washed with isopropyl alcohol. | 42.3 | 14,700 | 84.5 |
| 4 | Flask from Run 3 washed with stabilizer solution. | 6.9 | 16,240 | 89.5 |

Example IX

This example illustrates use of orthophosphoric acid as the stabilizer. The example consists of three runs carried out as in the preceding examples. A new Pyrex flask identical to those described in the preceding examples was used for the first run. In run 1 no initiator was added. In runs 2 and 3, 5 cc. of 2,2-bis(tertiary-butylperoxy)butane were added to the charge. Prior to each run the flask was treated as shown in the table. The following results were obtained.

| Run No. | Treatment of Flask | Oxidation Time, Hours | Oxygen Consumed, cc. at 0° C., 760 mm. Hg | $H_2O_2$ Yield (percent on oxygen consumed) |
|---|---|---|---|---|
| 1 | New flask washed with 5% phosphoric acid and drained. | 32.2 | 15,000 | 89.3 |
| 2 | Flask from Run 1 washed with phosphoric acid and drained. | 6.6 | 15,950 | 85.7 |
| 3 | Flask from Run 2 rinsed with isopropyl alcohol. | 6.9 | 14,700 | 79.1 |

Example X

The apparatus used for this example was the same as the apparatus described in Example V. A new reactor constructed of 52S aluminum was treated with sodium hydroxide solution and with 35% sulfuric acid as described in Example V, and then washed with isopropyl alcohol. The reactor then was rinsed with a 5% aqueous solution of orthophosphoric acid. Three preliminary runs were carried out without further phosphoric acid treatment of the reactor. In each run the charge to the reactor consisted of 2500 cc. of isopropyl alcohol and 20 cc. 2,2-bis(tertiary-butylperoxy)butane. The reaction temperature was about 114° C., the oxygen pressure was about 50 pounds per square inch (gauge), and reaction times of about 4 hours were used.

In a fourth run carried out in the same manner as the preceding three, the rate of consumption of oxygen was about 5 liters per hour and hydrogen peroxide was produced in a yield of about 30% based upon the amount of oxygen consumed. A fifth run then was carried out in the same reactor under the same conditions used in the fourth run except that 70 parts per million of orthophosphoric acid were added to the charge before the oxidation was commenced. In the presence of the added amount of orthophosphoric acid, the rate of uptake of oxygen was 21 liters of oxygen per hour and the yield of hydrogen peroxide when 73 liters of oxygen had been consumed was 85% based upon the amount of oxygen consumed.

This application is a continuation-in-part of our application Serial No. 170,681, filed June 27, 1950, now abandoned.

We claim as our invention:

1. The process for the production of hydrogen peroxide which comprises aerating and maintaining substantially saturated with gas containing molecular oxygen, a liquid mixture containing only secondary alcohol as the progenator of hydrogen peroxide and added hydrogen peroxide stabilizer at a temperature above 90° C., the aeration being continued until hydrogen peroxide is formed in appreciable and substantial quantity by non-photochemical partial oxidation of the secondary alcohol.

2. The process defined by claim 1 wherein the hydrogen peroxide stabilizer is an alkali metal salt of an oxy-acid of phosphorus.

3. The process defined by claim 1 wherein the hydrogen peroxide stabilizer is an oxy-acid of phosphorus.

4. The process defined by claim 1 wherein the hydrogen peroxide stabilizer is an acid-reacting salt of an oxy-acid of phosphorus.

5. The process defined by claim 1 wherein the hydrogen peroxide stabilizer is an alkaline-reacting salt of an oxy-acid of phosphorus.

6. The process defined by claim 1 wherein the hydrogen peroxide stabilizer is an alkali metal phosphate.

7. The process defined by claim 1 wherein the hydrogen peroxide stabilizer is an alkali metal salt of an oxy-acid of tin.

8. The continuous process for the production of hydrogen peroxide which comprises continuously introducing a lower secondary alcohol and a hydrogen peroxide stabilizer into a non-photochemical reaction zone wherein there is maintained at a temperature above 90° C. a body of liquid containing only said lower secondary alcohol as the progenator of hydrogen peroxide, corresponding ketone, hydrogen peroxide and up to about 500 parts per million of said stabilizer, while aerating and maintaining said liquid mixture substantially saturated with oxygen-containing gas, and continuously withdrawing from the reaction zone liquid mixture comprising lower secondary alcohol, corresponding ketone and hydrogen peroxide.

9. The process defined by claim 8 wherein the hydrogen peroxide stabilizer is an alkaline-reacting inorganic stabilizer.

10. The process defined by claim 8 wherein the hydrogen peroxide stabilizer is an alkali metal salt of an oxy-acid of phosphorus.

11. The process defined by claim 8 wherein the hydrogen peroxide stabilizer is an oxy-acid of phosphorus.

12. The process defined by claim 8 wherein the hydrogen peroxide stabilizer is an alkaline-reacting salt of an oxy-acid of phosphorus.

13. The process defined by claim 8 wherein the hydrogen peroxide stabilizer is an acid-reacting salt of an oxy-acid of phosphorus.

14. The process defined by claim 8 wherein the hydrogen peroxide stabilizer is an alkali metal salt of an oxy-acid of tin.

15. The process defined by claim 8 wherein the secondary alcohol is isopropyl alcohol.

16. A process for the production of hydrogen peroxide which comprises treating the inner surface of a reaction vessel with a hydrogen peroxide stabilizer, introducing a secondary alcohol into the vessel, passing a gas containing molecular oxygen into the secondary alcohol maintained as the only progenator of hydrogen peroxide in the vessel at a temperature above 90° C. so as to maintain said alcohol substantially saturated with gas containing molecular oxygen whereby hydrogen peroxide is produced by non-photochemical partial oxidation of the secondary alcohol, and recovering hydrogen peroxide from the oxidation product.

17. A process as defined in claim 16 wherein the secondary alcohol is isopropyl alcohol and the conversion thereof is limited to not over 20%.

18. A process according to claim 16 when the confining surfaces of the reaction zone are composed essentially of aluminum.

19. A process according to claim 16 when the confining surfaces of the reaction zone are composed essentially of glass.

20. The process defined by claim 16 in which the said hydrogen peroxide stabilizer is an alkali-metal salt of an oxy-acid of phosphorus.

21. The process defined by claim 16 in which the said hydrogen peroxide stabilizer is an oxy-acid of phosphorus.

22. The process defined by claim 16 in which the said hydrogen peroxide stabilizer is an acid-reacting salt of an oxy-acid of phosphorus.

23. The process defined by claim 16 in which the said hydrogen peroxide stabilizer is an alkaline-reacting salt of an oxy-acid of phosphorus.

(References on following page)

References Cited in the file of this patent

UNITED STATES PATENTS

| | | |
|---|---|---|
| 2,115,206 | Milas | Apr. 26, 1938 |
| 2,120,430 | Rieche | June 14, 1938 |
| 2,144,341 | Michalek et al. | Jan. 17, 1939 |
| 2,158,525 | Riedl et al. | May 16, 1939 |
| 2,215,883 | Riedl et al. | Sept. 24, 1940 |
| 2,430,865 | Farkas et al. | Nov. 18, 1947 |
| 2,434,888 | Rust et al. | Jan. 20, 1948 |
| 2,479,111 | Harris | Aug. 16, 1949 |
| 2,661,268 | McFayden et al. | Dec. 1, 1953 |

FOREIGN PATENTS

| | | |
|---|---|---|
| 294,265 | Great Britain | Oct. 18, 1928 |
| 435,401 | Great Britain | Sept. 17, 1935 |
| 460,208 | Great Britain | Jan. 22, 1937 |

OTHER REFERENCES

Frank: Article in "Chem. Rev.," pages 155–169, No. 1, vol. 46, February 1940.

Shanley et al.: Article in "Ind. and Eng. Chem.," pages 1536–1543, page 1542 pertinent, December 1947.

Pease: Article in "J. Am. Chem. Soc.," pages 5106–5110, pages 5109–10 pertinent, vol. 52, December 1930.

Thorpe: "Dictionary of Applied Chemistry," vol. III, 1916, page 69; vol. VI, 1943, page 346.

Schumb: "Industrial and Engineering Chemistry," vol. 41, May 1949, page 998.

Slater et al.: "The Anthraquinone Autoxidation Process for the Production of Hydrogen Peroxide," PB 4336, pages 5, 14, Mar. 29, 1946.

Walton et al.: "Journal of the American Chemical Society," vol. 54, pages 3228–3229.